United States Patent [19]

Eichenauer et al.

[11] Patent Number: 4,699,967
[45] Date of Patent: Oct. 13, 1987

[54] POLYSILOXANE BLOCK COPOLYMERS

[75] Inventors: Herbert Eichenauer; Christian Lindner, both of Cologne; Karl-Heinz Ott, Leverkusen; Peter Orth, Cologne; Hartwig Höcker, Eckersdorf, all of Fed. Rep. of Germany

[73] Assignee: Bayer Aktiengesellschaft, Leverkusen-Bayerwerk, Fed. Rep. of Germany

[21] Appl. No.: 820,067

[22] Filed: Jan. 21, 1986

[30] Foreign Application Priority Data

Jan. 30, 1985 [DE] Fed. Rep. of Germany ....... 3502928

[51] Int. Cl.$^4$ .............................................. C08G 77/04
[52] U.S. Cl. ........................................ 528/29; 528/26; 528/25; 525/446; 525/474
[58] Field of Search ............................ 528/26, 29, 25; 525/446, 474

[56] References Cited

U.S. PATENT DOCUMENTS 3,701,815 10/1972 Matzner et al. .
3,919,438 11/1975 Urkevich ............................ 525/446
3,935,154 1/1976 Cawley .
4,278,574 7/1981 Dworak et al. ..................... 525/446
4,348,510 9/1982 Keck et al. .......................... 525/446

OTHER PUBLICATIONS

Macromolecules, 1981, vol. 14, Nbr 3, Jun: M. Galin & A. Mathis., "Structural & Thermodynamic Study of Dimethylsiloxane-Ethylene Oxide PDMS-PEO-PDMS Triblock Copolymers": pp. 677–683.

Macromolecules, Nov./Dec., 1977, vol. 10, Nbr 6, James J. O'Malley, Thomas J. Pacansky, and Walter J. Stauffer., "Synthesis and Characterization of Poly(Hexamethylene Sebacate)Poly(Dimethylsiloxane) Block Copolymers": pp. 1197–1199.

*Primary Examiner*—Melvyn I. Marquis
*Attorney, Agent, or Firm*—Connolly & Hutz

[57] ABSTRACT

Block copolymers of recurring structural units of the series of polysiloxanes and recurring structural units of the series of aliphatic polyesters, polyethers or polyetheresters with rubber properties, the polymeric block-forming polymers in each case producing rubber-type products with glass transition temperatures below practical temperatures of use and a process for the production thereof.

3 Claims, No Drawings

POLYSILOXANE BLOCK COPOLYMERS

This invention relates to new block copolymers of recurring structural units of the series of polysiloxanes and recurring structural units of the series of aliphatic polyesters, polyethers or polyetheresters with rubber properties, the polymeric block-forming polymers in case producing rubber-type products, thus products with glass transition temperatures below practical temperatures of use.

Different types of block copolymers are known, for example styrene butadiene block copolymers, block copolymers of aliphatic polyesters or polyethers and polyesters of aromatic dicarboxylic acids or block copolymers based on aromatic polycarbonates.

In all these cases, at least one polymer block has a softening behaviour which can be described as thermoplastic (one glass transition temperature is far higher than room temperature). These block copolymers are characterised by particular properties owing to the combination of thermoplastic and rubber properties in one molecule.

Less known, however, are block copolymers in which each polymer block represents a rubber.

It has been found that block-type synthesized polymers based on polysiloxanes and polyester and/or polyether segments (the properties of which as homopolymers are to be described as rubber-type) may possess particularly interesting rubber properties, which could possibly be due to the chemical heterogeneity of the polymer structure. The new block copolymer rubbers can be vulcanized and produce rubber materials with new, unexpected properties.

The invention thus provides block-type synthesized rubber polymers of recurring structural units (I) with molecular weights of from 10,000 to 1,000,000, preferably from 10,000 to 50,000 and from 100,000 to 500,000

$$\pm[A-B]\pm \qquad I$$

whereby A represents bifunctional polysiloxane segments of the formula $$\pm[(R^1)(R^2)SiO]\pm_x \qquad II$$

wherein $R^1$ and $R^2$=aryl (particularly phenyl) or alkyl (particularly methyl) and x represents a number such that the molecular weight $\geq 500$ and B represents bifunctional aliphatic polyester—and/or aliphatic polyether segments with molecular weights $\geq 800$ and the glass transition temperatures of the polymeric blocks A and B are lower than 20° C., preferably lower than $-10°$ C.

The radicals B of the polymers according to the invention are preferably polyalkylene oxide radicals with $C_1$-$C_6$-alkylene units or bifunctional polyester radicals of the series of polycondensation products of aliphatic $C_2$-$C_{12}$-dicarboxylic acids and aliphatic $C_2$-$C_{18}$-alkylene diols.

The invention furthermore provides a process for the production of such polymers in which process an aliphatic polyester and/or polyether diol of the formula (III)

$$HO-B-OH \qquad III$$

and a polysiloxane of the formula (IV)

$$R^3COO-(-R^1)(R^2)SiO-)_x-COR^3 \qquad IV$$

wherein $R^3=C_1$-$C_{18}$-alkyl, $R^2$ and $R^1$=alkyl (particularly methyl) and/or aryl (particularly phenyl); x=an integer, are polycondensed under separation of the acid $R^3COOH$, optionally under catalysis or by means of acid-binding agents, the diol III having an average molecular weight of from 800 to 12,000 and the polysiloxane IV having an average molecular weight of from 500 to 20,000.

The polysiloxanes contained in the block copolymers are polydialkyl, polydiaryl or polyarylalkyl siloxanes, particularly polydimethyl siloxane or polymethylphenyl siloxane radicals. They have block molecular weights of from 500 to 20,000, preferably 800 to 12,000, particularly from 1,000 to 6,000; they are substantially linear.

The polyester segments forming the blocks B derive from aliphatic saturated or unsaturated dicarboxylic acids, for example from oxalic acid, succinic acid, adipic acid, azelaic acid, sebacic acid, carbonic acid, maleic acid, fumaric acid, butadiene dicarboxylic acid. Ethandiol, butandiol, hexandiol, neopentyl glycol, alkylene ether diols with molecular weights up to about 150, as well as unsaturated aliphatic diols such as butene diols, and higher unsaturated dicarboxylic acids with more than 10 carbon atoms in the molecule are particularly suitable as diol components of the polyesters. Polyether diol radicals of the series of polyalkylene ethers are also suitable as blocks B, for example polyformaldehyde radicals, polytetrahydrofuran radicals, polyethylene oxide radicals, polybutylene oxide radicals as well as the copolymers thereof.

In the block copolymers according to the invention, of units of formula $$-A-B$$

not only polyester or only polyether blocks can be present as component B. Also, part of the blocks B can be polyesters and the remainder can be polyether, finally blocks B can also be present which contain ether and ester functions adjacent to each other. If in addition to linear, also branched polyesters, polyethers or polysiloxanes are used for the production of the block copolymers, then block copolymers are obtained which have branched, but non-cross-linked structures.

Likewise suitable as components B are polyether or polyester-blocks, which have a sequence or also a block structure, for example polyethylene oxide-polypropylene oxide-block copolymer—as well as polyester-polyether-block-units.

Block copolymers according to the invention are likewise aliphatic polymers which contain the grouping —A—B—; such products are, for example, reaction products of polyether or polyester diols and bisacyl polysiloxanes in combination with polysiloxane diols. Higher or lower contents of polysiloxane-containing polymers are thereby obtained which have an optional quantity of the grouping —A—B— incorporated. The polymers thus arising then have higher molecular weights, in relating to polysiloxane segment, than 12,000.

The rubbers according to the invention are vulcanizable, particularly with radical initiators such as peroxides, azo compounds, percarbonates, peresters; for vulcanization, cross-linking auxiliaries can advantageously be used, for example polyfunctional unsaturated polyester resins, triallylcyanurate, triallylphosphates, citric acid triallylesters. A reinforcement of these vulcanizates is particularly effective, for example with carbon black, $SiO_2$, talcum, fibres or glass, this effect being due to the multiblock structure of chemically not identical polymer blocks.

The block copolymers according to the invention can be produced by polycondensing bis-acylated polysiloxanes of the formula IV with diols of the series of polyesters or polyethers. The starting components of the formulae III and IV are normally used in equimolar quantities; however, it can be advantageous to use one or the other component in slight excess. The final molecular weight can be controlled better and the type of end group determined. In order to determine the molecular weight already during synthesis, a molecular weight controller can be used, for example monofunctional compounds such as monoalcohols, monoacylated polysiloxanes, anhydrides, esters and acid chlorides.

The synthesis of the block copolymers can be carried out at temperatures of from 40° to about 200° C., particularly at from 80° to 150° C. This can be carried out in the absence or in the presence of solvent, for example with aromatic hydrocarbons, paraffins, chlorinated hydrocarbons, liquid amides, esters, ketones and ethers.

A preferred embodiment of the process begins in the absence of solvent and adds solvent at the end of polycondensation.

Catalysts and/or acid-binding agents are preferably used, for example organic or inorganic bases such as salts (carbonates of alkaline or alkaline earth metals) or soluble organic bases, such as tertiary amines, also phase transfer catalysts, phosphines, Lewis bases are suitable. Working in the presence of catalytic quantities of strong acids is possibly advantageous of certain reaction temperatures, particularly when the polycondensation is carried out by distilling off the formed acids (from the starting product IV).

The synthesis can be carried out discontinuously or continuously, also in kneading assemblies or worm assemblies.

It is likewise advantageous to introduce the total quantity of starting substance III or IV (in the reactor) and, depending on the progress of the reaction, to meter in the remaining quantity of various starting compounds IV or III.

Following the synthesis, the rubbers can be isolated, optionally under evaporation of the auxiliary solution or by filtering off the products formed from the separated acid, and can be stabilized by conventional antioxidants or screening agents.

The block copolymers according to the invention produce rubber-type products at room temperature which appear transparent or opaque depending on the components used.

By selecting the polyethers or polyesters present as block B, the hydrophobic or hydrophilic properties of the products are, for example, substantially changed, particularly when the products are synthesized on the basis of polyethylene oxides. The rubbers are characterised in a vulcanized or unvulcanized state by a surprising property combination of rubber properties, aging resistance, affinity to surrounding media or substrates. They have a better adhesion than pure polysiloxane rubbers and have good properties, even without the use of inert fillers.

They are suitable as tackifiers, adhesive components, elastic coatings, sealing compositions or insulating compositions.

EXAMPLES

Example 1

1000 parts by weight of a polytetrahydrofurandiol with a molecular weight of 2000 (determined from the OH number), 2000 parts by weight of an $\alpha,\omega$-bis-acetylated polydimethyl siloxane with a molecular weight of 4000 (determined by acetyl determination), 220 parts by weight of $Na_2CO_3$ and 3000 parts by weight of chlorobenzene are reacted for 3 hours at 140° C. The temperature is then raised with increasing viscosity of the solution to from 160° to 180° C. After a total reaction time of 7 hours, cooling and filtering takes place and the solvent is evaporated off. The resulting product produces a rubber with a Staudinger index of 1.1 dl/g (in tetrahydrofuran).

Example 2

Example 1 is repeated, a polyester diol of adipic acid and neopentylglycol/hexandiol in the weight ratio of 35:65 and with a total molecular weight of 2000 being used as the diol component. The resulting rubber-type product has a Staudinger index of 0.89 dl/g (in tetrahydrofuran).

Example 3

Example 1 is repeated, a mixture of 500 parts by weight of the polytetrahydrofuran described in Example 1 and 500 parts by weight of the polyester diol described in Example 2 being used as the diol component. The resulting multiblock copolymer of polyether-polyester-polysiloxane sequences has a Staudinger index of 1.2 dl/g in tetrahydrofuran.

Example 4

4000 parts by weight of a bis-acetylated polysiloxane from Example 1 are reacted with 100 parts by weight of polytetrahydrofuran diol of Example 1 and 300 parts by weight of $Na_2CO_3$ at 140° C. in 3 hours. The temperature is then raised to 160° C. and 1900 parts by weight of an $\alpha,\omega$-bis-acetylated polydimethylsiloxane with a molecular weight of 4000 are metered in within 3 hours. This reaction can also be carried out for 2 hours at 200° C. After dissolving the product in chlorobenzene and workingup as in Example 1 or 2, a rubber is obtained which contains 1.7% by weight of polyether incorporated. The molecular weight of the polymer determined by gel permeation chromatography is 100 000.

Example 5

100 parts by weight of the rubber from Example 2, 2 parts by weight of triallylcyanurate and 0.5 parts by weight of tert.-butyl-perpivalate are thoroughly mixed together. A film is produced from the mixture and annealed at 130° C. for half an hour. The resulting material is insoluble in all solvents and is vulcanized. Such vulcanizates adhere very well to all substrate surfaces and have an extraordinarily good low temperature resiliency with good compatibility with fillers and reinforcing fibres.

We claim:

1. Block-type rubber polymers of recurring structural units (I) with molecular weights of from 10,000 to 1,000,000

 (I)

whereby A represents polysiloxane radicals of the formula

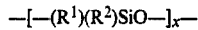 (II)

wherein $R^1$=aryl or alkyl and $R^2$=alkyl or aryl and x is a number such that the molecular weight is $\geq 500$ and B represents aliphatic aliphatic polyether radicals with molecular weights of 800 or more and the glass transition temperatures of the polymeric blocks A and B are below 20° C.

2. Rubber polymers according to claim 1, in which polymers the radical B is a polyalkylene oxide radical with $C_1$-$C_6$-alkylene units.

3. A process for the production of block-type synthesized rubber polymers according to claim 1, in which process an aliphatic polyether diol of the formula

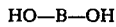 (III)

and a polysiloxane of the formula

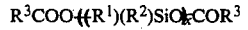 (IV)

wherein $R^3$=$C_1$-$C_{18}$-alkyl, $R^2$=alkyl, aryl, $R^1$=aryl, alkyl, x=an integer, are polycondensed under separation of the acid $R^3COOH$, the compound of the formula (III) having an average molecular weight of from 800 to 12 000 and the compound of the formula IV having an average molecular weight of from 500 to 20 000.

* * * * *